United States Patent
Aihara et al.

(10) Patent No.: US 10,858,751 B2
(45) Date of Patent: Dec. 8, 2020

(54) SURFACE-TREATED STEEL SHEET, PROCESS FOR PRODUCING THE SAME AND RESIN-COATED SURFACE-TREATED STEEL SHEET

(71) Applicants: Toyo Seikan Co., Ltd., Tokyo (JP); TOYO KOHAN CO., LTD., Tokyo (JP)

(72) Inventors: Mitsuhide Aihara, Yokohama (JP); Wataru Kurokawa, Yokohama (JP); Munemitsu Hirotsu, Yokohama (JP); Kunihiro Yoshimura, Kudamatsu (JP); Satoko Harada, Kudamatsu (JP); Kousuke Sasaki, Kudamatsu (JP); Masahiko Matsukawa, Tokyo (JP); Miwa Uchikawa, Tokyo (JP); Keisuke Yoshida, Tokyo (JP)

(73) Assignees: TOYO SEIKAN CO., LTD., Tokyo (JP); TOYO KOHAN CO., LTD., Tokyo (JP)

( * ) Notice: Subject to any disclaimer, the term of this patent is extended or adjusted under 35 U.S.C. 154(b) by 463 days.

(21) Appl. No.: 15/510,364

(22) PCT Filed: Mar. 11, 2015

(86) PCT No.: PCT/JP2015/057181
§ 371 (c)(1),
(2) Date: Mar. 10, 2017

(87) PCT Pub. No.: WO2016/038909
PCT Pub. Date: Mar. 17, 2016

(65) Prior Publication Data
US 2017/0253985 A1    Sep. 7, 2017

(30) Foreign Application Priority Data
Sep. 12, 2014 (JP) .................. 2014-185874

(51) Int. Cl.
*B32B 15/00* (2006.01)
*C25D 5/10* (2006.01)
(Continued)

(52) U.S. Cl.
CPC .............. *C25D 9/10* (2013.01); *B32B 15/013* (2013.01); *C25D 5/48* (2013.01)

(58) Field of Classification Search
None
See application file for complete search history.

(56) References Cited

U.S. PATENT DOCUMENTS 7,531,051 B2    5/2009    Nakayama et al.
2005/0175798 A1    8/2005    Kurokawa et al.
(Continued)

FOREIGN PATENT DOCUMENTS

EP    3051006 A1    8/2016
EP    3085816 A1    10/2016
(Continued)

OTHER PUBLICATIONS

Nagashima et al., machine translation of JP 2011-127141, Jun. 30, 2011 (Year: 2011).*
(Continued)

*Primary Examiner* — Humera N. Sheikh
*Assistant Examiner* — Mary I Omori
(74) *Attorney, Agent, or Firm* — Sughrue Mion, PLLC

(57) ABSTRACT

A surface-treated steel sheet for cans forming a coating of a compound containing chiefly Zr and containing F, the amount of Zr being 80 to 200 mg/m$^2$ and the amount of F being not less than 12 mg/m$^2$ in the coating on the surface that becomes the outer surface side of the can. The surface-treated steel sheet is capable of effectively preventing the resin coating from peeling on the outer surface side of the can at dented portions.

5 Claims, 1 Drawing Sheet

(51) Int. Cl.
  *C25D 9/10*  (2006.01)
  *B32B 15/01* (2006.01)
  *C25D 5/48*  (2006.01)

(56) References Cited

U.S. PATENT DOCUMENTS

| | | |
|---|---|---|
| 2006/0185769 A1 | 8/2006 | Nakayama et al. |
| 2010/0230288 A1 | 9/2010 | Kurokawa et al. |
| 2013/0034745 A1 | 2/2013 | Tachiki et al. |
| 2013/0206285 A1 | 8/2013 | Suzuki et al. |
| 2016/0230301 A1* | 8/2016 | Yoshimura ............... C25D 9/10 |

FOREIGN PATENT DOCUMENTS

| | | |
|---|---|---|
| JP | 07-011483 A | 1/1995 |
| JP | 2004-190121 A | 7/2004 |
| JP | 2005-97712 A | 4/2005 |
| JP | 2006-348360 A | 12/2006 |
| JP | 2009-084623 A | 4/2009 |
| JP | 2011127141 A * | 6/2011 |
| WO | 02/103080 A1 | 12/2002 |
| WO | 2011/118588 A1 | 9/2011 |
| WO | 2011/141410 A1 | 11/2011 |
| WO | 2012/036200 A1 | 3/2012 |
| WO | WO-2015045624 A1 * | 4/2015 ............... C25D 7/00 |

OTHER PUBLICATIONS

Communication dated Apr. 4, 2018, from the European Patent Office in counterpart European Application No. 15840460.8.
"History of Coated Steel Sheets for Cans in Japan", Foundation, Japanese Association of Steels, Oct. 1998, pp. 87-90.
International Search Report for PCT/JP2015/057181 dated Jun. 16, 2015.

* cited by examiner

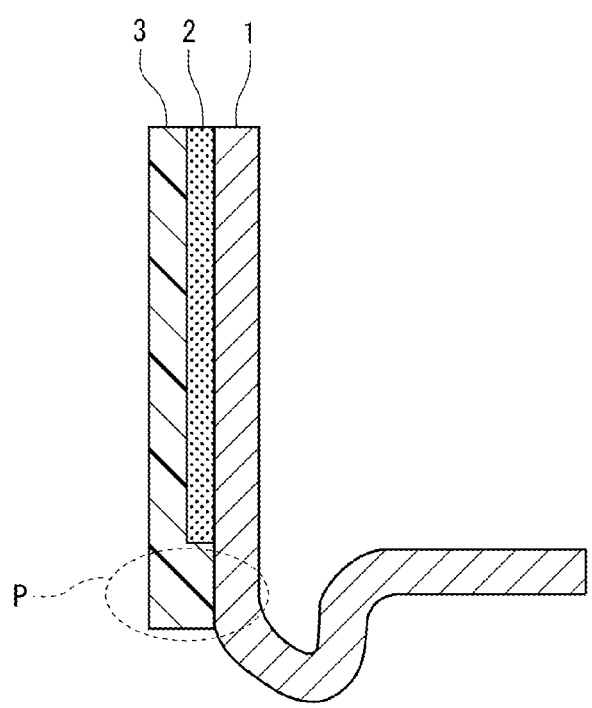

SURFACE-TREATED STEEL SHEET, PROCESS FOR PRODUCING THE SAME AND RESIN-COATED SURFACE-TREATED STEEL SHEET

CROSS REFERENCE TO RELATED APPLICATIONS

This application is a National Stage of International Application No. PCT/JP2015/057181 filed Mar. 11, 2015, claiming priority based on Japanese Patent Application No. 2014-185874 filed Sep. 12, 2014, the contents of all of which are incorporated herein by reference in their entirety.

TECHNICAL FIELD

This invention relates to a surface-treated steel sheet, to a process for producing the same and to a resin-coated surface-treated steel sheet. More specifically, the invention relates to a surface-treated steel sheet capable of providing cans that feature excellent adhesiveness, corrosion resistance, resistance against the elution and dent resistance after the retort sterilization, and to a process for producing the same.

BACKGROUND ART

The treatment with the chromate has heretofore been known as a treatment for improving close adhesion between a steel sheet and an organic coating in the field of domestic appliances, building materials, vehicles, aircraft, containers and the like, and has, therefore, been widely employed owing to its excellent corrosion resistance and close adhesion.

The treatment with the chromate pertains to either the one of the type of containing hexavalent chromium in the coating or the one of the type of containing no hexavalent chromium in the coating. In recent years, however, from the standpoint of environment and sanitation in the working environment, it is a growing trend to ban the use of any starting materials that contain hexavalent chromium even in such cases that no hexavalent chromium is left in the final products.

Materials used for producing metal containers such as cans and lids are treated with the chromate of the type that does not leave hexavalent chromium in the final products, as a matter of course. Usually, the materials have, further, been coated with a resin film or the like. For instance, a tin-plated steel sheet is cathodically electrolyzed in an aqueous solution of sodium bichromate, a steel sheet is cathodically electrolyzed in an aqueous solution of a fluoride-containing chromium anhydrite, and an aluminum alloy is treated with a chromic phosphate, followed, further, by the coating with a resin.

Metal containers such as cans and the like are, in many cases, subjected to the retort treatment with hot water in order to sterilize the contents. Therefore, the materials are subjected to a severe environment arousing a problem of decrease in the adhesion between the resin coating and the surface of the metal. To solve the problem, therefore, various studies were so far made. At present, in order to improve close adhesion during the treatment with hot water, the tin-plated sheet and the steel sheet electrolytically treated with chromate that are used as materials for producing cans, are washed with warm water or hot water in the step of finally treating the surfaces. Namely, anions such as sulfuric acid ions and fluorine ions in the treated coating are controlled to obtain a metal surface that features excellent adhesion to the resin coating (non-patent document 1, patent document 2).

As the chromium-free surface treatment studied in recent years in connection with the steel sheets, there has been proposed a dip treatment using a treating liquid that contains Zr (zirconium) or Ti (titanium) (patent document 1). However, the steel sheet treated for its surface by being dipped in the Zr- or Ti-containing solution has poor corrosion resistance in the coating thereof. Besides, the rate of depositing the coating is small as compared to the electrolytic chromate-treated steel sheet (TFS) that has heretofore been used as a material for producing cans. Therefore, the productivity is very poor. As a high-speed treatment to substitute for the dip treatment, therefore, there have been proposed a Zr and/or Ti treatment and/or an Al treatment by applying the cathodic electrolysis. It has been known that both of these treatments are capable of forming an oxygen compound of a metal on the surface of the base material at high speeds (patent documents 3, 4 and 5).

PRIOR ART DOCUMENTS

Patent Documents

Patent document 1: International Laid-Open WO2002/103080
Patent document 2: JP-A-7-11483
Patent document 3: JP-A-2004-190121
Patent document 4: JP-A-2005-97712
Patent document 5: JP-A-2006-348360
Patent document 6: International Laid-Open WO2012/036200

Non-Patent Document

Non-patent document 1: "History of Coated Steel Sheets for Cans in Japan", Foundation, Japanese Association of Steels, published Oct. 31, 1998, page 87, last line to page 90.

OUTLINE OF THE INVENTION

Problems that the Invention is to Solve

If it is attempted to improve the corrosion resistance of a metallic base material without forming a metal-plated layer thereon but, instead, directly forming a coating of an oxygen compound of a metal comprising chiefly an oxygen compound such as of Zr, Al or Ti on the surface of the metallic base material, it becomes necessary to increase the thickness of the coating (amount of coating) as compared to that of the metal-plated layer. Specifically, in the use for seamless cans that are worked to a large degree, the underlying iron may be exposed due to the working, or the adhesion to the resin coating may decrease. Therefore, it has been urged to maintain corrosion resistance by increasing the amount of the coating and, at the same time, to improve close adhesion to the resin coating.

In addition to the above items related to close adhesion, there still remains another problem which the present invention is to solve, i.e., resistance against the elution which is to prevent the components constituting the metal container from eluting out into the content. For the metal containers, it is very important to maintain the quality of the content and, therefore, special attention must be paid to the components that may elute out into the content from the metal container. In general, elution of metallic components of the container can be represented by elution of iron due to corrosion and elution of anions such as sulfuric acid ions and fluorine ions in the coating on the treated surface. Therefore, attention must be paid to the amount of the coating on treated surface, surface state, and adhesiveness to the resin coating such as film or coating, in addition to paying attention to the pH of the content and the sterilizing conditions.

A patent document 2 is disclosing an example of improving the close adhesion by washing the surface of the coating of an oxygen compound of a metal on the metal-plated layer with hot water. However, in case it is required to form the coating in a large amount as described above, the washing with hot water, that has heretofore been used for the electrolytic chromate-treated steel sheets, is not enough for attaining the surface properties and for suppressing the elution as desired. Further, if the electrolytic chromate-treatment line is applied to the formation of the coating of the oxygen compound of a metal and if the washing is conducted for further longer periods of time than the conventional methods, it was learned that there still exist many problems such as an increase in the load in connection with the production and an increase in the amount of energy consumption, imposing limitation on the speed for operating the surface-treatment line, requiring an increased number of the tanks for washing, and increased amount of hot water that must be used.

In order to solve the above problems, the present applicant has proposed a surface-treated steel sheet obtained by forming a coating of a compound comprising chiefly Zr and containing F and by controlling the amount of F in the coating to be 0.5 to 10 mg/m$^2$ by using an ion-containing aqueous solution and a process for producing the same (JP-IA-2013-197714).

The above surface-treated steel sheet and the process for the production thereof are capable of providing cans that feature excellent adhesiveness of the resin coating, corrosion resistance and resistance against the elution. It was, however, learned that when subjected to the retort sterilization treatment, the seamless cans formed by using the above resin-coated surface-treated steel sheet have poor dent resistance. That is, what is called dent resistance is a practical shock resistance that is really required for the canned products. This is such a property that even in case the canned products are fallen or the canned products collided with each other and the canned products are dented, close adhesion of the coating and coverage are still completely maintained. Here, it has been learned that if the above seamless cans are filled with the content and are subjected to the retort sterilization treatment, the resin coating is often peeled on the outer surfaces of the cans at dented portions. The peeling of resin coating becomes conspicuous particularly when a biaxially stretched film containing an inorganic pigment such as titanium dioxide is used as the resin coating.

It is, therefore, an object of the present invention to provide a surface-treated steel sheet that is capable of effectively preventing the resin coating from peeling on the outer surfaces of the cans at dented portions, a process for producing the same and a resin-coated surface-treated steel sheet.

Means for Solving the Problems

According to the present invention, there is provided a surface-treated steel sheet for cans forming a coating of a compound comprising chiefly Zr and containing F, the amount of Zr being 80 to 200 mg/m$^2$ and the amount of F being not less than 12 mg/m$^2$ in the coating on the surface that becomes the outer surface side of the can.

In the surface-treated steel sheet of the present invention, it is desired that:
1. The amount of Zr is 80 to 200 mg/m$^2$ and the amount of F is not more than 25 mg/m$^2$ in the coating on the surface that becomes the inner surface side of the can;
2. The amount of F is 12 to 40 mg/m$^2$ in the coating on the surface that becomes the outer surface side of the can; and
3. The amount of F is 0.5 to 10 mg/m$^2$ in the coating on the surface that becomes the inner surface side of the can.

According to the present invention, further, there is provided a resin-coated surface-treated steel sheet having a biaxially stretched film containing an inorganic pigment laminated on the coating of the surface-treated steel sheet on the side that becomes the outer surface of the can.

According to the present invention, further, there is provided a process for producing a surface-treated steel sheet for cans by forming, on a steel sheet, a coating of a compound comprising chiefly Zr and containing F, the process including the steps of:

forming the coating that contains Zr in an amount of 80 to 200 mg/m$^2$ by the cathodic electrolysis in an aqueous solution that contains Zr ions and F ions; and adjusting the surface by bringing an alkaline aqueous solution into contact with the coating on the surface that becomes the inner surface side of the can and by bringing warm water into contact with the coating on the surface that becomes the outer surface of the can, in the process for producing the surface-treated steel sheet of the present invention, it is desired that:
1. The alkaline aqueous solution contains at least one or more of sodium, ammonium and potassium, and has a pH of not less than 9; and
2. Warm water has a temperature of 30 to 70° C.

Effects of the Invention

The present invention is capable of providing a surface-treated steel sheet which, if the amount of Zr and the amount of F are controlled to lie in the above-mentioned ranges in the coating of the compound which chiefly comprises Zr and contains F on the surface that becomes the outer surface side of the can, is capable of providing seamless cans that feature excellent dent resistance after the retort sterilization, effectively preventing the resin coating from peeling on the outer surfaces of the cans at dented portions even after the retort sterilization.

Upon controlling the amount of F and the amount of Zr to lie in the above-mentioned ranges on the surface of the surface-treated steel sheet that becomes the inner surface side of the can, further, it is made possible to provide seamless cans that feature excellent adhesion to the resin coating, corrosion resistance and resistance against the elution on the inner surface side of the cans.

The resin-coated surface-treated steel sheet of the present invention effectively prevents the resin coating from peeling at dented portions even in case there is used, as the resin coating, a biaxially stretched film containing an inorganic pigment, though it so far tended to be peeled off at dented portions on the outer surface side of the cans, specifically, after the retort sterilization.

According to the process for producing the surface-treated steel sheet of the invention, further, it is made possible to produce the surface-treated steel sheet in good productivity containing Zr and F in amounts controlled to lie in the above-mentioned ranges on the surface that becomes the inner surface of the cans and on the surface that becomes the outer surface of the cans.

The actions and effects of the invention will become obvious from the results of Examples described later.

Namely, if the amount of F is smaller than the above range on the outer surface side of the cans, the dent resistance is poor after the retort treatment despite the amount of Zr is in the above range (Comparative Example 2). On the other hand, if the amount of Zr is smaller than the above range on the outer surface side of the cans, the dent resistance is poor after the retort sterilization despite the amount of F is in the above range (Comparative Example 3). However, if the amount of Zr and the amount of F are within the ranges as specified by the present invention, satisfactory dent resistance is obtained on the outer surface side of the cans even after the retort sterilization (Examples 1 to 14).

BRIEF DESCRIPTION OF THE DRAWING

[FIG. 1] is a sectional view illustrating part of a seamless can formed in an Example.

MODES FOR CARRYING OUT THE INVENTION (Surface-Treated Steel Sheet)

The surface-treated steel sheet of the present invention is used for producing cans and is forming a coating of a compound that chiefly comprises Zr and contains F, the amount of Zr being 80 to 200 mg/m$^2$ and the amount of F being not less than 12 mg/m$^2$ in the coating of the composition on the surface that becomes the outer surface side of the can, which is an important feature from the standpoint of improving the above-mentioned dent resistance.

It is considered that the coating of the composition comprising chiefly zirconium and containing fluorine formed on the surface-treated steel sheet of the invention has a non-crystalline structure like $ZrO_x(OH)_{y-z}F_z$. Through the drying and firing, the coating undergoes the dehydration, dispels F, and turns into an oxidized coating having much crystalline components. As the heating is further continued, it is considered that the coating finally approaches $ZrO_2$. However, the heating in excess of thermal hysteresis which the ordinary can materials receive induces cracks in the coating due to a change in the structure and renders the coating to become more like ceramics, inviting not only a decrease in the workability but also a decrease in the adhesiveness to the resin coating, which is not desirable. It is, therefore, desired that the surface-treating layer maintains the structure like $ZrO_x(OH)_{y-z}F_z$ that contains F and OH.

The present inventors have studied about the relationships among the coating components such as amount of Zr, amount of F, cross-cut corrosion resistance, adhesiveness to the coating resin, and dent resistance after the retort treatment, specifically, on the surface that becomes the outer surface of the cans. As a result, the inventors have discovered that the amount of Zr is better large from the standpoint of corrosion resistance and close adhesion. As for the amount of F, however, a preferred range differs depending on the surface that becomes the outer surface of the can and the surface that becomes the inner surface of the can.

Namely, as for zirconium, if the amount of Zr is small, defective parts are made present much in the surface-treating coating; i.e., the coating permits iron forming the base material to easily elute out. Iron elutes out in the anodic reaction. Due to the cathodic reaction which is the counter-reaction thereof, however, an alkali forms on the interface between the coating resin and the metal coating. The alkali that is formed accelerates the elution of fluorine from the surface-treating coating and becomes a cause of interfacial peeling between the coating resin and the surface-treating layer.

Therefore, if the amount of zirconium becomes smaller than the above range on either the surface that becomes the inner surface of the can or the surface that becomes the outer surface thereof, the adhesiveness decreases to the resin coating and, at the same time, the dent resistance after the retort sterilization decreases on the surface that becomes the outer surface of the can. Besides, the cross-cut corrosion resistance becomes poorer on the surface that becomes the inner surface of the can than that of if the amount of zirconium is within the above-mentioned range.

Here, even if the amount of zirconium is larger than the above range, no further improved effect can be expected, which is disadvantageous in economy. Besides, excess of zirconium deposits on an electric current-flowing roll that is used for the cathodic electrolytic treatment and forms ruggedness thereon. After all, high-voltage electric discharge takes place and locally develops poor appearance such as traces of electric discharge (arc spots).

As for fluorine, further, if the surface-treated steel sheet containing F in very large amounts in the coating is used for producing metal cans, fluorine that is present in an excess amount in the surface-treating layer on the surface that becomes the inner surface of the cans elutes out into the contents during the retort-sterilization of the cans or while the cans are stored at high temperatures, and flavor of the contents are likely to be spoiled. If the amount of F is too small on the surface that becomes the outer surface of the cans, on the other hand, the resin coating might peel off at dented portions after the retort sterilization; i.e., dent resistance decreases.

That is, a decrease in the adhesiveness of the resin coating at the time of retort sterilization is caused by the formation of an alkali due to the elution of the component of the surface-treating coating and the cathodic reaction. As described above, formation of the alkali accelerates the elution of fluorine from the surface-treating coating, induces a change in the structure of the surface-treating layer, and causes a decrease in the cohesive force of the coating. The decrease in the cohesive force of the coating becomes conspicuous in the dented portions after the retort sterilization. Therefore, the surface-treating coating must contain F in a predetermined amount.

In producing the surface-treated steel sheet of the invention, therefore, from the above-mentioned point of view, the surfaces are adjusted by being treated differently depending on the surface that becomes the inner surface of the cans and the surface that becomes the outer surface thereof. Namely, on the surface that becomes the inner surface of the can, the amount of F is decreased so will not to elute out without, however, affecting the corrosion resistance or the close adhesion. On the surface that becomes the outer surface of the can, on the other hand, F is contained in an amount within the above-mentioned range to suppress the resin coating from peeling at the dented portions after the retort sterilization.

That is, on the surface of the surface-treated steel sheet that becomes the outer surface of the can, the amount of F must not be less than 12 mg/m$^2$. Even if the amount of F is too large, on the other hand, no further improved effect is expected but rather fluorine elutes out causing disadvantage in economy. Desirably, therefore, F is contained in an amount of 12 to 40 mg/m² to meet the amount of Zr in a range in which the surface-treating coating is allowed to maintain the above-mentioned structure.

Further, on the surface of the surface-treated steel sheet that becomes the inner surface of the can, it is desired that the amount of F is not more than 25 mg/m² from the standpoint of suppressing the elution thereof as described above. If the amount of F is very small, on the other hand, the surface-treating coating undergoes the hydration and its structure changes causing a decrease in the adhesiveness to the resin coating and in the corrosion resistance as a result of a decrease in the cohesive force of the surface-treating coating. Therefore, the amount of F is, desirably, not less than 0.5 mg/m².

(Method of Producing Surface-Treated Steel Sheets)

<Step of Forming the Coating>

In the process for producing the surface-treated steel sheet of the invention, first, the steel sheet, in the step of forming the coating, is cathodically electrolyzed in an electrolytic treating liquid which is an aqueous solution containing Zr ions and F ions so that the coating of a compound chiefly comprising zirconium and containing fluorine is formed on both surfaces of the steel sheet in such a fashion that the amount of Zr is in a range of 80 to 200 mg/m² and the amount of F is not less than 12 mg/m² and, specifically, in a range of 12 to 40 mg/m².

The steel sheet after the coated with the compound thereon is squeezed through the rolls to remove the electrolytic treating solution, washed with water, further, squeezed through the rolls to remove the washing water, and is sent to the next step of adjusting the surfaces. After the electrolytic treating solution has been removed by the rolls, the steel sheet may not be washed with water.

In the electrolytic treating solution used in the step of forming the coating, it is desired that the concentration of Zr is 1,000 to 10,000 ppm and the concentration of F is 600 to 13,000 ppm. It is desired that the electrolytic treating solution has a pH of 2 to 5 and, more preferably, 2.5 to 4. The temperature of the electrolytic treating solution is desirably 30 to 60° C.

Various kinds of compounds that will be described later can be added to the electrolytic treating solution used in the step of forming the coating. Here, the electrolytic treating solution basically contains nitric acid ions and ammonium ions for adjusting the pH as well as Fe ions eluted out from the base material in addition to containing Zr ions and F ions.

There is no particular limitation on the chemicals used for forming Zr ions that constitute the electrolytic treating solution, and there can be used, for example, $K_2ZrF_6$, $(NH)_2ZrF_6$, $(NH_4)_2ZrO(CO_3)_2$, $H_2ZrF_6$, $ZrO(NO_3)_2$ and $ZrO(CH_3COO)_2$. In the invention, the above chemicals may be used alone or in a combination of two or more kinds.

If the coating of a Zr compound is to be formed by the cathodic electrolytic treatment, it is, usually, desired to use a treating solution that contains F ions in addition to the above-mentioned Zr ions as the electrolytic treating solution. F ions contained in the electrolytic treating solution work as a complexing agent that enhances solubility of Zr ions in the electrolytic treating solution. Therefore, the Zr compound can be precipitated maintaining a uniform thickness on the base material, and the adhesion can be further improved between the coating and the organic resin layer.

If the electrolytic treating liquid contains F ions in small amounts, then Zr locally precipitates; i.e., the coating includes a mixture of portions where Zr is thickly present and portions where Zr s thinly present. Namely, the coating lacks uniformity in the thickness and, as a result, has poor adhesiveness and corrosion resistance after the working. In the step of forming the coating, therefore, it is important that the molar ratio F/Zr of F atoms to Zr atoms in the coating is so controlled as to be not less than 0.6.

There is no particular limitation on the chemicals used for forming F ions in the electrolytic treating solution, and there can be used ammonium zirconium fluoride, aluminum fluoride, titanium fluoride, sodium fluoride, ammonium fluoride, hydrofluoric acid, calcium fluoride, hexafluorosilicic acid, and sodium hexafluorosilicate. Among them, it is desired to use those chemicals that are highly soluble in water.

In order to improve electric conductivity in the treating solution and to adjust the pH of the treating solution, further, the electrolytic treating solution may be added with electrolytes such as nitric acid ions and ammonium ions in ranges in which they do not impair the formation of the Zr compound coating.

To the electrolytic treating solution, furthermore, there can be added one or more kinds of additives selected from such organic acids as citric acid, lactic acid, tartaric acid and glycolic acid or such high molecular compounds as polyacrylic acid, polyitaconic acid and phenol resin. Upon adding additives such as organic acid and phenol resin to the electrolytic treating solution, additives such as organic acid and phenol resin are contained in the Zr compound coating that is formed to thereby impart flexibility of the coating of the oxygen compound of a metal and to further improve adhesiveness to the organic resin layer. The electrolytic treating solution may, further, contain phosphoric acid and phosphate.

In subjecting the base material to the cathodic electrolytic treatment, the current density is not specifically limited but is, preferably, 1 to 30 A/dm².

If the base material is to be subjected to the cathodic electrolytic treatment, it is desired to employ a discrete electrolytic system which repeats the cycle of flowing the electric current and interrupting the electric current. In this case, the total time for flowing the electric current to the base material (total time for flowing the electric current in conducting the cycle of flowing and interrupting the electric current a plurality of number of times) is, preferably, 0.3 to 30 seconds.

In subjecting the base material to the cathodic electrolytic treatment, further, an opposing electrode of any kind may be installed on the base material if it does not dissolve in the electrolytic treating solution while the cathodic electrolytic treatment is being conducted. It is, however, desired to use a titanium plate coated with iridium oxide from such a standpoint that it produces a small oxygen overvoltage and that it sparingly dissolves in the electrolytic treating solution.

<Step of Adjusting the Surfaces>

The surfaces are adjusted as described below. That is, the surface-treated steel sheet forming, the coating of the compound that chiefly comprises zirconium and contains fluorine obtained through the step of forming the coating, is subjected to the step of adjusting the surfaces by using an alkaline aqueous solution for the coating on the surface that becomes the inner surface of the can and by using warm water for the coating on the surface that becomes the outer surface of the can.

As described above, on the surface that becomes the inner surface of the can, F that is present in an excess amount in the coating of the compound is decreased by using the alkaline aqueous solution from the standpoint of suppressing the anions such as of fluorine from entering into the content due to the retort sterilization treatment. On the surface that becomes the outer surface of the can, on the other hand, there is no problem of anions that elute and enter into the content. However, it becomes necessary to suppress the resin coating from peeling at dented portions after the retort sterilization. It is, therefore, desired to maintain the compound coating formed in the step of forming the coating.

From the above point of view in the present invention, the compound coating on the surface that becomes the inner surface of the can is adjusted for its surface by using an alkaline aqueous solution. Further, the compound coating on the surface that becomes the outer surface of the can is also adjusted for its surface by bringing warm water into contact therewith to prevent the surface thereof from becoming uneven that would be brought about as the alkaline aqueous solution used for adjusting the inner surface of the can comes in contact with the edge and near the edge of the outer surface of the can locally causing a decrease in the amount of F.

<Adjusting the Surface that Becomes the Inner Surface of the Can>

The surface of the surface-treated steel sheet of the invention that becomes the inner surface of the can is adjusted by bringing the alkaline aqueous solution into contact with the surface that becomes the inner surface of the can so that the amount of F in the compound coating is controlled to be not more than 25 mg/m$^2$ and, specifically, to lie in a range of 0.5 to 10 mg/m$^2$. Examples of the treatment include spray treatment, dip treatment and cathodic electrolytic treatment. According to the present invention, however, it is desired to employ the spray treatment since it makes it possible to adjust the inner and outer surfaces simultaneously.

Next, the alkaline aqueous solution is removed by using the rolls, washed with water and, further, the washing water is removed by using the rolls followed by drying using the hot air or the like.

It is desired that the alkaline aqueous solution contains at least one or more of sodium, ammonium and potassium, and, specifically, sodium. These ions easily bond to fluorine ions which are anions, and work to efficiently remove fluorine.

The total amount of sodium ions, potassium ions and ammonium ions contained in the alkaline aqueous solution is not less than 0.001 mols/L, preferably, not less than 0.01 mols/L and, more preferably, not less than 0.02 mols/L.

As the alkaline compounds used for preparing the alkaline aqueous solution, there is no limitation if they are soluble in water. There can be exemplified sodium hydroxide, sodium carbonate, sodium hydrogencarbonate, sodium phosphate, sodium hydrogenphosphate, sodium borate, potassium hydroxide, potassium carbonate, ammonia and ammonium zirconium carbonate. Among them, sodium hydroxide and potassium hydroxide are particularly preferred. The sodium hydroxide and potassium hydroxide exhibit high pH values despite their concentrations are low, and make it possible to execute the processing at low temperatures in short periods of time offering advantage in productivity. It is also allowable to use two or more kinds of alkaline compounds in combination.

As required, further, the aqueous solution for adjusting the surfaces can be added with various kinds of surfactants and chelating agents.

It is desired that the alkaline aqueous solution has a pH of not lower than 9 and, specifically, in a range of 11 to 14. If the pH is lower than the above range, fluorine cannot be removed to a sufficient degree unless the treatment is conducted at a high temperature or for an extended period of time causing disadvantage in productivity.

It is desired that the temperature of the alkaline aqueous solution is in arrange of 30 to 70° C. and, specifically, 40 to 60° C. If the temperature is higher than the above range, fluorine elutes out excessively from the compound coating, and the corrosion resistance may decrease. If the temperature is lower than the above range, on the other hand, the amount of fluorine cannot be decreased to a sufficient degree, and resistance against the elution may decrease.

The treating time differs depending on the pH of the alkaline aqueous solution, temperature and manner of the treatment, and cannot be definitely specified, but is, preferably, in a range of 0.5 to 5 seconds.

<Treatment for Adjusting the Surface that Becomes the Outer Surface of the Can>

The treatment for adjusting the surface of the surface-treated steel sheet of the invention that becomes the outer surface of the can, is carried out by bringing warm water into contact with the surface that becomes the outer surface of the can to control the amount of F in the compound coating to be not less than 12 mg/m$^2$. Next, the warm water is squeezed by using the rolls and is, thereafter, dried with the hot air or the like.

The water used for the treatment for adjusting the surface is heated at a temperature in a range of 30 to 70° C. and, specifically, 40 to 60° C. If the temperature is lower than the above range, the alkaline aqueous solution that is used for adjusting the surface that becomes the inner surface of the can and that has flown to the back surface side may not be washed away to a sufficient degree. If the temperature is higher than the above range, on the other hand, fluorine may elute out from the compound coating.

It is, further, desired that the treatment with hot water is conducted for a period of time in a range of 0.3 to 5 seconds. If the treating time is longer than the above range, fluorine may elute out. If the treating time is shorter than the above range, on the other hand, the washing may not be effected to a sufficient degree.

Treatment with the warm water can take a variety of forms depending on the production line for producing the surface-treated steel sheet, such as spray treatment, shower treatment, flow-over treatment or dip treatment so far as the water is allowed to come in contact with the surface of the surface-treated steel sheet that becomes the outer surface of the can, is used for adjusting the surface that becomes the inner surface of the can, and is capable of washing away the alkaline aqueous solution that has flown to the back surface side. It is, however, desired to adjust the surface that becomes the outer surface by the spray treatment since it enables the warm water to come in contact with the surface that becomes the outer surface evenly and simultaneously with the treatment for adjusting the surface that becomes the inner surface.

[Rinsing the Inner and Outer Surfaces After the Step of Adjusting the Surfaces]

In the process for producing the surface-treated steel sheet of the present invention, the inner and outer surfaces thereof are washed by rinsing after the step of forming the coating and the step of adjusting the surfaces. It is desired that the rinsing is conducted under such a condition that there is no change in the amount of Zr or in the amount of F in the coating of the surface-treated steel sheet after the step of adjusting the surfaces.

The surfaces may be rinsed with water of normal temperature. In case the surfaces are to be rinsed twice or more, at least the final rinsing is carried out by using warm water of 40 to 60° C. so that the surface-treated steel sheet after rinsed can be easily dried. Namely, the final rinsing is conducted in the form of dip treatment or spray treatment. If the temperature of the warm water is higher than the above range, fluorine that is controlled in the step of adjusting the surfaces starts eluting out, and the amount of F may deviate from the value controlled in the step of adjusting the surfaces. If the temperature is lower than the above range, on the other hand, energy is needed for cooling, which is a disadvantage in economy.

The rinsing is, particularly preferably, conducted in the form of dip treatment since it makes it possible to wash the inner and outer surfaces of the surface-treated steel sheet simultaneously yet in good rinsing efficiency. The dipping time differs depending on the temperature of the warm water that is used but is, desirably, in a range of 0.5 to 5 seconds.

After the rinsing, the steel sheet is squeezed by the rolls to remove water and is dried with the hot air or the like.

[Apparatus for Production]

In the process for producing the surface-treated steel sheet of the present invention, it is allowable that the surface of the surface-treated sheet that becomes the inner surface thereof and the surface that becomes the outer surface thereof are separately treated through the step of forming the coating, through the step of adjusting the surfaces and through the step of rinsing. From the standpoint of productivity, however, it is, specifically, desired that both surfaces of the steel sheet are treated simultaneously.

(Steel Sheet as the Base Material)

As the steel sheet for use as the surface-treated steel sheet of the present invention, there can be used, for example, a hot-rolled steel sheet based on a continuously casted aluminum killed steel, a cold-rolled steel sheet obtained by cold-rolling the hot-rolled steel sheet, and a steel sheet obtained by plating metals inclusive of Zn, Sn, Ni, Cu, Al, etc. on the hot-rolled steel sheet or the cold-rolled sheet.

It is, further, allowable to use a steel sheet having, on part or on the whole surface thereof, an alloy layer such as of an Sn—Ni—Fe alloy, an Sn—Fe alloy or an Ni—Fe alloy, as well as a steel sheet having a layer of a metal such as Sn or Ni, further, plated on the above alloy layer. Among them, a steel sheet is most desirably used as the base material without having a metal-plated layer or having a metal-plated layer but permitting iron to be locally exposed in a dispersed manner from the standpoint of cost.

The thickness of the base material is not specifically limited and may be suitably selected depending on the use, but is, preferably, 0.07 to 0.4 mm.

(Resin Coating)

As described above, the surface-treated steel sheet obtained by the present invention has a resin coating formed on the compound coating. The resin coating excellently adheres to the compound coating. Even in case the surface-treated steel sheet is retort-treated, the resin coating is effectively prevented from peeling at dented portions on the surface that becomes the outer surface of the can. The resin coating, further, effectively prevents the corrosion from proceeding even in case the resin coating is cracked and the metal surface is exposed in wet environment. The resin coating on the surface that becomes the inner surface of the can, further, suppresses the metal components constituting the container from eluting out.

The resin that constitutes the resin coating is not specifically limited and may be suitably selected depending on the use of the surface-treated steel sheet of the invention (depending on the use such as cans and containers for containing specific contents). Namely, there can be exemplified resin films made from various thermoplastic resins and coatings made from thermosetting coating materials or thermoplastic coating materials. As the resin coating made from the thermoplastic resin, there can be exemplified olefin resin films such as of polyethylene, polypropylene, ethylene-propylene copolymer, ethylene-vinyl acetate copolymer, ethylene-acrylic ester copolymer and ionomer; polyester films such as of polyethylene terephthalate and polybutylene terephthalate; polyamide films such as nylon 6, nylon 6,6, nylon 11, and nylon 12; polyvinyl chloride film and polyvinylidene chloride film, which may not have been stretched or may have been biaxially stretched. Among them, particularly preferred is an unoriented polyethylene terephthalate obtained by copolymerizing an isophthalic acid. The resins for constituting the organic resin layer may be used in a single kind or in a blend of different resins.

If the thermoplastic resin coating is formed as the resin coating, the coating may be of a single resin layer or a multiplicity of resin layers formed by the simultaneous extrusion. Multiplicity of polyester resin layers offer such an advantage that a polyester resin having excellent adhesiveness can be used as the underlying layer, i.e., on the side of the surface-treated steel sheet and that a polyester resin having resistance against the content, i.e., having resistance against being extracted or having property of not adsorbing flavor component can be used as the surface layer.

Being expressed as surface layer/lower layer, examples of the multiplicity of polyester resin layers include polyethylene terephthalate/polyethylene terephthalate-isophthalate; polyethylene terephthalate/polyethylene-cyclohexylenedimethylene-terephthalate; polyethylene terephthalate-isophthalate having a small isophthalate content-polyethylene terephthalate-isophthalate having a large isophthalate content; polyethylene terephthalate-isophthalate/[blend of polyethylene terephthalate-isophthalate and polybutylene terephthalate-adipate] and the like, to which only, however, the invention is in no way limited. It is desired that the thickness ratio of the surface layer:lower layer is in a range of 5:95 to 95:5.

The above resin coatings can be blended with known blending agents for resins, anti-plocking agent such as anti-blocking agent or amorphous silica, inorganic filler, various antistatic agents, lubricant, antioxidant, and ultraviolet-ray absorber according to a known recipe.

In the present invention, in particular, the resin coating has been effectively suppressed from peeling on the outer surface of the can at the dented portions after the retort sterilization. It, therefore, becomes allowable to favorably use a biaxially stretched film containing inorganic pigments such as titanium dioxide, silicon oxide and zinc oxide, though they, so far, tended to peel off.

The resin coating applied to the surface-treated steel sheet obtained by the present invention, in the case of the thermoplastic resin film, has a thickness in a range of, usually, 3 to 50 µm and, specifically, 5 to 40 µm and, in the case of a coating, has a thickness in a range of 1 to 50 µm and, specifically, 3 to 30 µm after fired. If the thickness is smaller than the above range, corrosion resistance becomes insufficient. If the thickness exceeds the above range, on the other hand, problems are likely to occur in regard to workability.

The surface-treated steel sheet obtained by the present invention can be coated with the resin by any means such as, in the case of the thermoplastic resin coating, extrusion-coating method, cast film heat-adhesion method or biaxially stretched film heat-adhesion method. In the case of the extrusion-coating method, the polyester resin in a molten state is extruded onto the surface-treated steel sheet and is thermally adhered thereto. Namely, the polyester resin is melt-kneaded by an extruder, extruded into the form of a thin film through a T-die, and the molten resin film that is extruded is passed together with the surface-treated steel sheet through a pair of laminating rolls so as to be pressed together into a unitary structure under cold condition followed by quenching. If a multiplicity of polyester resin layers is to be extruded, use is made of an extruder for extruding the surface resin layer and an extruder for extruding the lower resin layer. The flows of resins from these extruders are met together in a multi-layer die. Thereafter, the resultant flow of resins may be extruded like in the case of extruding the single resin layer. Further, by passing the surface-treated steel sheet between the pair of laminating rolls in a vertical direction and by feeding the webs of molten resins to both sides thereof, it is made possible to coat both surfaces of the base material with the polyester resins.

Concretely described below is the production of the organic resin-coated surface-treated steel sheet having an organic coating of polyester resin based on the extrusion-coating method. The surface-treated steel sheet, as required, is preheated by a heating device, and is fed to a nipping position between the pair of laminating rolls. The polyester resin, on the other hand, is extruded into the form of a thin film through the die head of the extruder, fed into between the laminating rolls and the surface-treated steel sheet, and is press-adhered onto the surface-treated steel sheet by the laminating rolls. The laminating rolls are maintained at a predetermined temperature. Thin films of the thermoplastic resin such as polyester are pressed onto the surface-treated steel sheet and are thermally adhered thereto followed by cooling from both sides thereof so as to obtain an organic resin-coated surface-treated steel sheet. Usually, the organic resin-coated surface-treated steel sheet that is formed is, further, introduced into a water tank for cooling, and is quenched therein to prevent thermal crystallization.

In the extrusion-coating method, the polyester resin layer assumes the crystallinity of a low level, i.e., has a density which is different from the amorphous density thereof by not more than 0.05 $g/cm^3$ due to the resin composition that is selected and due to quenching by the rolls and in the cooling tank. Therefore, the polyester resin layer is sufficiently guaranteed for its workability in the subsequent steps of forming cans and lids. The quenching operation is not limited to the above example only but may be to spray the cooling water onto the organic resin-coated surface-treated steel sheet that is formed so as to quench the laminated sheet.

The polyester resin is thermally adhered to the surface-treated steel sheet by utilizing the quantity of heat possessed by the molten resin layer and the quantity of heat possessed by the surface-treated steel sheet. A proper range of the temperature (T1) for heating the surface-treated steel sheet is, usually, 90° C. to 290° C. and, specifically, 100° C. to 280° C. while a proper range of the temperature of the laminating rolls is 10° C. to 150° C.

The resin coating can also be formed on the surface-treated steel sheet obtained by the production method of the present invention by thermally adhering, onto the surface-treated steel sheet, a polyester resin film that is formed in advance by a T-die method or an inflation method. As the film, there can be used an unstretched film formed by a cast-forming method by quenching the film that is extruded. It is, further, allowable to use a biaxially stretched film obtained by biaxially stretching the film sequentially or simultaneously at a stretching temperature, and thermally setting the film after having been stretched.

(Metal Containers)

As for the metal container (can body) formed by using the surface-treated steel sheet of the invention, it is desired that the container is formed by using the organic resin-coated surface-treated steel sheet obtained by coating the surfaces of the surface-treated steel sheet with the resin as described earlier relying on any can-producing method. Concretely speaking, the organic resin-coated surface-treated steel sheet can be used for forming a three-piece can (welded can) having a seam on the side surface thereof and a seamless can (two-piece can). From the standpoint of close adhesion to the organic resin as described above, however, the surface-treated steel sheet containing Zr in large amounts is most desirably used for forming seamless cans.

The seamless can is produced relying on a conventional means such as draw working, draw-redraw working, bend-elongation working (stretching) based on the draw-redrawing, bend-elongation ironing working based on the draw-redrawing, or draw-ironing working in a manner that the organic coating is on the inner surface side of the cans and/or on the outer surface side of the cans.

When it comes to a seamless can that is subjected to a high degree of working such as bend-elongation working (stretch working) based on the draw-redrawing, bend-elongation-ironing working based on the draw-redrawing or the like, it is, particularly, desired that the organic coating is a thermoplastic resin coating formed by the extrusion-coating method, a cast-formed unstretched film that is thermally laminated, or a biaxially stretched film that is thermally laminated. The organic resin-coated surface-treated steel sheet features excellent close adhesion during the working, and the coating features excellent close adhesion even when it is subjected to severe working. It is, therefore, made possible to provide a seamless can having excellent corrosion resistance.

(Lids)

The can lid formed by using the surface-treated steel sheet of the invention is, desirably, formed by using the organic resin-coated surface-treated steel sheet like the metal container described above, and is formed by a known lid-forming method. Concretely, the lid may be a flat lid, an easy-open can lid of the stay-on-tub type, or an easy-open can lid of the full-open type.

According to the invention, the can lids of a variety of types can be formed without limitation by using the organic resin-coated surface-treated steel sheet of the present invention.

EXAMPLES

The invention will now be concretely described by way of Examples to which only, however, the invention is in no way limited. The materials to be coated, dewaxing agents and organic coatings are those arbitrarily selected from those placed in the market, and are not to impose limitation on the process for producing the surface-treated steel sheet of the present invention.

Example 1

<Step of Forming the Coating>

As a starting sheet, use was made of a low-carbon steel sheet 0.225 mm in thickness and 200 mm in width. Next, as a pre-treatment, the steel sheet was dewaxed by the electrolysis with an alkali and was washed with an acid by being dipped in sulfuric acid. Thereafter, the steel sheet was dipped in an electrolytic treating solution and was cathodically and electrolytically treated so that the steel sheet was coated on its both surfaces with a compound that chiefly comprised of Zr and contained F. Next, the steel sheet was squeezed with the rolls to remove the electrolytic treating solution.

Composition of the electrolytic treating solution:
An aqueous solution in which ammonium zirconium fluoride was dissolved as a Zr compound, the concentration of Zr being 6,000 ppm and the concentration of F being 7,000 ppm.

pH of the electrolytic treating solution:
3.0 (pH was adjusted with nitric acid and/or ammonia).

Temperature of the electrolytic treating solution: 40° C.

Current density during the cathodic electrolysis (written as CD in Table 1):
10 A/dm$^2$ Method of flowing electric current during the cathodic electrolysis:
The electric current was flown 8 times (hereinafter called number of cycles) for both the inner surface side of the can and the outer surface side of the can, each cycle consisting of flowing a current for 0.15 seconds and interrupting the current for 0.1 second.

<Step of Adjusting the Surface>

The steel sheet after the step of forming the coating was treated on the surface that becomes the inner surface of the can with the spray of an alkaline aqueous solution for a predetermined period of time and, at the same time, on the surface that becomes the outer surface of the can with the spray of warm water for a predetermined period of time. Next, the steel sheet was squeezed with the rolls to remove the alkaline aqueous solution and the warm water.

(The surface that becomes inner surface side of the can)
Composition of the alkaline aqueous solution: The amount of the sodium hydroxide (NaOH) was so adjusted that the aqueous solution acquired the following pH.
pH of the alkaline aqueous solution: 11.7
Temperature of the alkaline aqueous solution: 40° C.
Time for spraying the alkaline aqueous solution: 1 second (The surface that becomes outer surface side of the can)
Kind of warm water: water for industrial use
Temperature of water: 40° C.
Time for spraying warm water: 1 second <Rinsing After the Step of Adjusting the Surfaces>

After the step of adjusting the surfaces has been finished, the steel sheet was dipped in water for rinsing for 2 seconds to remove the liquids adhered on the inner and outer surfaces.

The water for rinsing was the water for industrial use heated at 40° C. The water was dried with the hot air, and the surface-treated steel sheet was obtained.

<Measuring the Amount of the Surface-Treating Coating>

After the step of forming the coating, the step of adjusting the surfaces and the rinsing, the steel sheet to be tested was washed with water, dried with the hot air, and was measured for its amount of the coating by a method described below. The amount of the coating was separately measured on the inner surface side of the can and on the outer surface side of the can.

<Measuring the amount of Zr>

By using an X-ray fluorometric analyzer (Model: ZSX100e manufactured by Rigaku Co.), the surface-treated steel sheet obtained above was measured for its amount of Zr contained in the metal compound coating. Table 1 shows the amount of Zr after the step of forming the coating and the step of adjusting the surfaces. The amount of Zr after the rinsing was the same as the amount of Zr after the step of adjusting the surfaces. Therefore, Table 1 does not show the amount of Zr after the rinsing.

<Measuring the amount of F>

Microanalysis of the amount of F based on the X-ray fluorometry poses limitation in regard to quantitative precision. Specifically, it is difficult to determine the amount of F directly from the surface-treated steel sheet containing F in amounts of less than 1.5 mg/m$^2$. After having studied variously, therefore, we have selected the following measuring method. That is, by using a special cell that can be retort-pressurized, the surface-treated steel sheet was retort-treated over a predetermined surface area at 130° C. for 30 minutes in a state of being contacted to a predetermined amount of very pure water. Fluorine ions released into very pure water due to the treatment were measured by the ion chromatography (DX-320 manufactured by DIONEX Co.). The amount of F present in very pure water was found from the obtained concentration of F and was converted into the amount of F present in the surface-treated steel sheet per a unit area, and was regarded to be the amount of F in the coating. Table 1 shows the amount of F after the step of forming the coating and the step of adjusting the surfaces. The amount of F after the rinsing was the same as the amount of F after the step of adjusting the surfaces. Therefore, Table 1 does not show the amount of F after the rinsing.

<Producing the Resin-Coated Surface-Treated Steel Sheets>

Onto one surface of the above surface-treated steel sheet that becomes the inner surface side of the can, there was thermally adhered a 19 µm-thick stretched film of a polyethylene terephthalate/isophthalate copolymer composition containing 11 mol % of an isophthalic acid component by using the laminating rolls. Onto the another surface that becomes the outer surface side of the can, there was thermally adhered a 13 µm-thick stretched film of a polyethylene terephthalate/isophthalate copolymer composition containing 12 mol % of the isophthalic acid component and, further, containing 30% by weight of titanium oxide and colored white by using the laminating rolls. Thereafter, the steel sheet was readily cooled with water while paying attention such that the film was oriented to a suitable degree to thereby obtain a resin-coated surface-treated steel sheet. The thus obtained resin-coated surface-treated steel sheet was partly used for evaluating cross-cut corrosion resistance, and the rest was used for producing metal cans.

(Producing the metal cans)

Paraffin wax was electrostatically applied onto both surfaces of the resin-coated surface-treated steel sheet obtained above. The steel sheet was punched into a circle 143 mm in diameter and was draw-formed into a cup 91 mm in diameter and 36 mm in height according in a customary manner. The draw-formed cup was at the same time subjected to the draw-ironing working repetitively two times to form a cup having a small diameter and a large height. The thus obtained cup possessed properties as described below.

Diameter of cup: 52.0 mm
Height of cup: 111.7 mm
Reduction ratio of sheet thickness in the can wall relative to the initial sheet thickness: 30%

After the doming, the cup was heat-treated at 220° C. for 60 seconds to remove strain from the resin film, followed by trimming for the open end, printing on the curved surface by applying 30 mg of an indigo ink per a can and 100 mg of a finishing varnish per a can as shown in FIG. 1 and, after fired at 215° C. for 80 seconds, necking into a diameter of 50.8 mm and flanging to thereby obtain a seamless can having a capacity of 200 ml.

In FIG. 1, reference numeral 1 denotes the can body formed by working the resin-coated surface-treated steel sheet, 2 denotes the printed ink layer and 3 denotes the finishing varnish layer.

<Evaluating the Dent Resistance on the Outer Surface of the Can>

The obtained seamless can was filled with 183 g of distilled water maintaining a degree of vacuum of 30 KPa in the can, retort-treated at 125° C. for 30 minutes and was stored at room temperature for one day with the lid facing upward. Next, the can was left to stand still sideways with the rolled direction of the steel sheet forming the bottom of the can in the horizontal direction. A spherical weight 52.0 mm in diameter and weighing 1 kg was allowed to fall from a height of 40 mm on the can near the radius portion of body wall at the lower part of the side wall of the can so that the can was deformed. Thereafter, a cellophane adhesive tape of a width of 24 mm was stuck to the deformed part of the can as uniformly as possible. The tape was then vividly removed to judge the degree of peel of the white film by eye and through an optical microscope (magnifying power of 50 times) on the following basis to evaluate the dent resistance on the outer surface of the can. The portion where the peeling was observed was the portion where the finishing varnish only was applied on the white film on the outer surface shown in FIG. 1 (portion where no indigo ink was applied as denoted by P in FIG. 1). Ten cans were evaluated. A mark X represents the case where even one can was recognized to be peeling as observed with the naked eye, o represents the case where not more than 4 cans were recognized to be peeling as observed with the optical microscope though they were not recognized to be peeling by the observation with the naked eye, and ⓞ represents the case where not more than 2 cans were recognized to be peeling as observed with the optical microscope. Those evaluated to be o and ⓞ were regarded to be acceptable.

<Evaluating the Elution of F on the Inner Surface of the Can>

The obtained seamless can was filled with 183 g of very pure water and was retort-treated at 130° C., for 30 minutes. Thereafter, fluorine ions released into very pure water was measured by the ion chromatograph (DX-320 manufactured by DIONEX Co.). The cans releasing F by more than 0.25 ppm were evaluated to be ×, the cans releasing F by more than 0.20 ppm but not more than 0.25 ppm was evaluated to be Δ, the cans releasing F by more than 0.10 ppm but not more than 0.20 ppm were evaluated to be o, and the cans releasing F in an amount not more than a detectable limit (0.10 ppm) were evaluated to be ⓞ. Those evaluated to be Δ·o·ⓞ were regarded to be acceptable.

<Evaluating the Cross-Cut Corrosion Resistance on the Inner Surface Side of the Can>

By using a cutter knife, a portion of the obtained resin-coated surface-treated steel sheet that would become the inner surface side of a can was engraved in a crossing manner in the directions of 45 degrees relative to the rolling direction over a length of 4 cm deep enough to reach the steel sheet to prepare a test piece. The test piece was dipped in a model solution (aqueous solution containing sodium chloride and citric acid each at a concentration of 1.5% by weight) maintained at 37° C. for one week to evaluate the state of corrosion. Thereafter, the test piece was taken out from the model solution and was observed and evaluated with the eye in regard to if the organic resin layer was peeled or the color has changed due to the formation of the corroded product in and near the cross-cut portion. The test piece whose color has changed or whose film has peeled by a maximum width of not less than 2 mm around the cross-cut portion was evaluated to be ×, the test piece having a maximum width of peeling of not less than 1 mm but less than 2 mm was evaluated to be Δ, and the test piece having a maximum width of peeling of less than 1 mm was evaluated to be o. Those evaluated to be Δ·o were regarded to be acceptable.

Table 1 shows the treating methods, amounts of coatings and evaluated results.

Examples 2 to 14

Surface-treated steel sheets were prepared in the same manner as in Example 1 but changing the conditions of the step of forming the coating and the step of adjusting the surfaces as shown in Table 1, and were evaluated in the same manner as in Example 1. Table 1 shows the treating methods, amounts of coatings and evaluated results.

Comparative Example 1

A surface-treated steel sheet was prepared in the same manner as in Example 1 but changing the number of cycles into 11 times in the step of forming the coating on the inner surface side of the can and spraying the warm water of 40° C. instead of spraying the alkaline aqueous solution in the step of adjusting the surfaces, and was evaluated in the same manner as in Example 1. The amount of F was 28 mg/m$^2$ on the inner surface side of the can, and the elution of F in the inner surface of the can was evaluated to be ×.

Comparative Example 2

A surface-treated steel sheet was prepared in the same manner as in Example 1 but spraying an aqueous solution of sodium hydroxide of a pH of 11.0 instead of spraying the warm water in the step of adjusting the surface on the outer surface side of the can, and was evaluated in the same manner as in Example 1. The amount of F was 10 mg/m$^2$ on the outer surface side of the can, and the dent resistance was evaluated to be × on the outer surface of the can.

Comparative Example 3

A surface-treated steel sheet was prepared in the same manner as in Example 1 but changing the number of cycles into 5 times in the step of forming the coating on the outer surface side of the can, and was evaluated in the same manner as in Example 1. The amount of Zr was 69 mg/m$^2$ on the outer surface side of the can, and the dent resistance was evaluated to be × on the outer surface of the can.

TABLE 1

| | Outer surface side of can | | | | | | | | | |
|---|---|---|---|---|---|---|---|---|---|---|
| | Treating method | | | | | Amount of the coating | | | | |
| | Step of forming the coating | | | Step of adjusting the surfaces | | After the coating is formed | | After the surfaces are adjusted | | Evaluation |
| | CD A/dm² | Number of cycles | Temp. °C. | Temp. °C. | Time sec. | Zr mg/m² | F mg/m² | Zr mg/m² | F mg/m² | Dent resistance on the outer surface |
| Ex. 1 | 10 | 8 | 40 | 40 | 1 | 104 | 19 | 104 | 19 | ◎ |
| 2 | 10 | 6 | 40 | 70 | 1 | 80 | 15 | 80 | 12 | ○ |
| 3 | 10 | 16 | 40 | 40 | 1 | 200 | 40 | 200 | 40 | ◎ |
| 4 | 10 | 8 | 40 | 40 | 1 | 107 | 20 | 107 | 20 | ◎ |
| 5 | 10 | 8 | 40 | 40 | 1 | 110 | 20 | 110 | 20 | ◎ |
| 6 | 10 | 8 | 40 | 40 | 1 | 101 | 18 | 101 | 18 | ◎ |
| 7 | 10 | 8 | 40 | 40 | 1 | 107 | 18 | 107 | 18 | ◎ |
| 8 | 10 | 8 | 40 | 40 | 1 | 106 | 20 | 106 | 20 | ◎ |
| 9 | 10 | 8 | 40 | 30 | 1 | 110 | 19 | 110 | 19 | ◎ |
| 10 | 10 | 8 | 40 | 70 | 1 | 101 | 18 | 101 | 14 | ○ |
| 11 | 10 | 8 | 40 | 40 | 1 | 104 | 20 | 104 | 20 | ◎ |
| 12 | 10 | 8 | 40 | 40 | 1 | 104 | 19 | 104 | 19 | ◎ |
| 13 | 10 | 8 | 40 | 40 | 1 | 106 | 18 | 106 | 18 | ◎ |
| 14 | 10 | 8 | 40 | 40 | 1 | 108 | 20 | 108 | 20 | ◎ |

| | Inner surface side of can | | | | | | | | | | | |
|---|---|---|---|---|---|---|---|---|---|---|---|---|
| | Treating method | | | | | | Amount of the coating | | | | | |
| | Step of forming the coating | | | Step of adjusting the surfaces | | | | After the coating is formed | | After the surfaces are adjusted | | Evaluation |
| | CD A/dm² | Number of cycles | Temp. °C. | Chemical agent | Temp. °C. | pH | Time sec. | Zr mg/m² | F mg/m² | Zr mg/m² | F mg/m² | *1 *2 |
| Ex. 1 | 10 | 8 | 40 | NaOH | 40 | 11.7 | 1 | 100 | 19 | 100 | 2 | ◎ ○ |
| 2 | 10 | 8 | 40 | NaOH | 40 | 11.7 | 1 | 108 | 20 | 108 | 2 | ◎ ○ |
| 3 | 10 | 8 | 40 | NaOH | 40 | 11.7 | 1 | 108 | 20 | 108 | 2 | ◎ ○ |
| 4 | 10 | 6 | 40 | NaOH | 40 | 11.7 | 1 | 80 | 16 | 80 | 1 | ◎ ○ |
| 5 | 10 | 16 | 40 | NaOH | 40 | 11.7 | 1 | 200 | 38 | 200 | 4 | ◎ ○ |
| 6 | 10 | 8 | 40 | NaOH | 40 | 13.0 | 1 | 107 | 20 | 107 | 0.5 | ◎ △ |
| 7 | 10 | 8 | 40 | NaOH | 40 | 11.0 | 1 | 104 | 18 | 104 | 10 | ○ ◎ |
| 8 | 10 | 16 | 40 | NaOH | 40 | 10.8 | 1 | 196 | 38 | 196 | 25 | △ ○ |
| 9 | 10 | 8 | 40 | NaOH | 40 | 11.7 | 1 | 100 | 18 | 100 | 2 | ◎ ○ |
| 10 | 10 | 8 | 40 | NaOH | 40 | 11.7 | 1 | 104 | 20 | 104 | 2 | ◎ ○ |
| 11 | 10 | 8 | 40 | NaOH | 40 | 9.0 | 1 | 107 | 20 | 107 | 19 | △ ○ |
| 12 | 10 | 8 | 40 | KOH | 40 | 11.7 | 1 | 105 | 20 | 105 | 2 | ◎ ○ |
| 13 | 10 | 8 | 40 | NH₄OH | 40 | 11.7 | 1 | 104 | 18 | 104 | 2 | ◎ ○ |
| 14 | 10 | 8 | 40 | Na₂CO₃ | 40 | 11.7 | 1 | 102 | 20 | 102 | 2 | ◎ ○ |

| | Outer surface side of can | | | | | | | | | |
|---|---|---|---|---|---|---|---|---|---|---|
| | Treating method | | | | | Amount of the coating | | | | |
| | Step of forming the coating | | | Step of adjusting the surfaces | | After the coating is formed | | After the surfaces are adjusted | | Evaluation |
| | CD A/dm² | Number of cycles | Temp. °C. | Temp. °C. | Time sec. | Zr mg/m² | F mg/m² | Zr mg/m² | F mg/m² | Dent resistance on the outer surface |
| Comp. Ex. 1 | 10 | 8 | 40 | 40 | 1 | 110 | 20 | 110 | 20 | ◎ |
| 2 | 10 | 8 | 40 | NaOH pH 11.0 | 1 | 101 | 20 | 101 | 10 | X |
| 3 | 10 | 5 | 40 | 40 | 1 | 69 | 13 | 69 | 13 | X |

TABLE 1-continued

| | Inner surface side of can | | | | | | | | | | | | |
|---|---|---|---|---|---|---|---|---|---|---|---|---|---|
| | Treating method | | | | | | | Amount of the coating | | | | | |
| | Step of forming the coating | | | Step of adjusting the surfaces | | | | After the coating is formed | | After the surfaces are adjusted | | Evaluation | |
| | CD | Number of | Temp. | Chemical | Temp. | | Time | Zr | F | Zr | F | | |
| | A/dm² | cycles | ° C. | agent | ° C. | pH | sec. | mg/m² | mg/m² | mg/m² | mg/m² | *1 | *2 |
| Comp. Ex. 1 | 10 | 11 | 40 | warm water | 40 | 8.0 | 1 | 147 | 28 | 147 | 28 | X | ○ |
| 2 | 10 | 8 | 40 | NaOH | 40 | 11.7 | 1 | 110 | 20 | 110 | 2 | ◎ | ○ |
| 3 | 10 | 8 | 40 | NaOH | 40 | 11.7 | 1 | 101 | 19 | 101 | 2 | ◎ | ○ |

*1: Elution of F, inner surface
*2: Cross-cut corrosion, inner surface

The invention claimed is:

1. A seamless can formed of a surface-treated steel sheet having coatings of a compound comprising chiefly Zr and containing F, the coatings comprising a coating on an outer surface side of the seamless can and a coating on an inner surface side of the seamless can,
wherein an amount of Zr is 80 to 200 mg/m² and an amount of F is not less than 12 mg/m² in the coating on the outer surface side of the seamless can,
an amount of Zr is 80 to 200 mg/m² and an amount of F is 0.5 to 10 mg/m² in the coating on the inner surface side of the seamless can, and
a biaxially stretched film containing titanium dioxide is laminated on the coating on the outer surface side of the seamless can.

2. The seamless can formed of the surface-treated steel sheet according to claim 1, wherein the amount of F is 12 to 40 mg/m² in the coating on the outer surface side of the seamless can.

3. A process for producing the seamless can formed of the surface-treated steel sheet according to claim 1, by forming, on a steel sheet, the coatings of the compound comprising chiefly Zr and containing F, the process including the steps of:
forming the coating on the outer surface side of the seamless can that contains Zr in the amount of 80 to 200 mg/m² by cathodic electrolysis in an aqueous solution that contains Zr ions and F ions; and
adjusting the inner and outer surfaces of the seamless can by bringing an alkaline aqueous solution into contact with the coating on the inner surface side of the seamless can and by bringing warm water into contact with the coating on the outer surface side of the seamless can.

4. The process according to claim 3, wherein the alkaline aqueous solution contains at least one or more of sodium, ammonium and potassium, and has a pH of not less than 9.

5. The process according to claim 3, wherein the warm water has a temperature of 30° to 70° C.

* * * * *